(12) United States Patent
Vauchel

(10) Patent No.: US 9,133,789 B2
(45) Date of Patent: Sep. 15, 2015

(54) NACELLE FOR AIRCRAFT ENGINE HAVING A NOZZLE WITH A VARIABLE SECTION

(75) Inventor: Guy Bernard Vauchel, Le Havre (FR)

(73) Assignee: AIRCELLE, Gonfreville l'Orcher (FR)

( * ) Notice: Subject to any disclaimer, the term of this patent is extended or adjusted under 35 U.S.C. 154(b) by 729 days.

(21) Appl. No.: 12/747,294

(22) PCT Filed: Dec. 19, 2008

(86) PCT No.: PCT/FR2008/001803
§ 371 (c)(1),
(2), (4) Date: Jun. 10, 2010

(87) PCT Pub. No.: WO2009/103905
PCT Pub. Date: Aug. 27, 2009

(65) Prior Publication Data
US 2010/0269511 A1    Oct. 28, 2010

(30) Foreign Application Priority Data

Dec. 21, 2007 (FR) ...................................... 07 08974

(51) Int. Cl.
| | |
|---|---|
| *F02K 1/09* | (2006.01) |
| *B64C 7/02* | (2006.01) |
| *F02K 1/72* | (2006.01) |
| *F02K 3/075* | (2006.01) |
| *F23R 3/60* | (2006.01) |

(Continued)

(52) U.S. Cl.
CPC ... *F02K 1/09* (2013.01); *B64C 7/02* (2013.01); *F02K 1/72* (2013.01); *B64D 33/04* (2013.01); *F02C 7/20* (2013.01); *F02K 3/075* (2013.01); *F02K 9/84* (2013.01); *F05D 2240/14* (2013.01); *F05D 2250/34* (2013.01); *F23R 3/60* (2013.01); *Y02T 50/671* (2013.01)

(58) Field of Classification Search
CPC ............. F02K 3/075; F02K 9/84; F23R 3/60; Y02T 50/67; B64D 33/04
USPC ............. 60/771, 226.1, 226.2, 228, 230, 232, 60/796, 798, 799; 239/265.19, 265.25, 239/265.27, 265.31; 244/110 B
See application file for complete search history.

(56) References Cited

U.S. PATENT DOCUMENTS 3,779,010 A * 12/1973 Chamay et al. ............. 60/226.2
4,802,629 A    2/1989 Klees
(Continued)

FOREIGN PATENT DOCUMENTS

| FR | 605512 | 5/1926 |
|---|---|---|
| FR | 2132380 | 11/1972 |

(Continued)

OTHER PUBLICATIONS

International Search Report; PCT/FR2008/001803; Aug. 6, 2009.

*Primary Examiner* — Craig Kim
(74) *Attorney, Agent, or Firm* — Brinks Gilson & Lione

(57) ABSTRACT

The invention relates to a nacelle for an aircraft engine that comprises a front cowling (13) and a rear cowling (1a), the rear cowling (1a) being mounted so as to slide between an upstream position defining a reduced nozzle (9) section and a downstream position defining an enlarged nozzle (9) section. The nacelle includes an intermediate member (25) arranged edge-to-edge with said front cowling (13), said member defining a housing (27) for receiving the upstream edge (11) of said rear cowling (1a) when the latter is in the upstream position.

16 Claims, 5 Drawing Sheets

(51) Int. Cl.
*F02C 7/20* (2006.01)
*B64D 33/04* (2006.01)
*F02K 9/84* (2006.01)

(56) References Cited

U.S. PATENT DOCUMENTS

| | | | |
|---|---|---|---|
| 5,609,313 A | * | 3/1997 | Cole et al. ........................ 244/54 |
| 5,655,360 A | | 8/1997 | Butler |
| 6,151,883 A | * | 11/2000 | Hatrick et al. ............... 60/226.2 |
| 6,170,254 B1 | * | 1/2001 | Cariola ........................ 60/226.2 |
| 2009/0151320 A1 | * | 6/2009 | Sternberger ................. 60/226.2 |
| 2009/0188233 A1 | * | 7/2009 | Vauchel et al. .............. 60/226.2 |
| 2010/0148012 A1 | * | 6/2010 | McDonough et al. ...... 244/53 B |

FOREIGN PATENT DOCUMENTS

| | | |
|---|---|---|
| FR | 2358555 | 2/1978 |
| FR | 2902839 | 12/2007 |
| GB | 1343888 | 1/1974 |
| GB | 1421153 | 1/1976 |

* cited by examiner

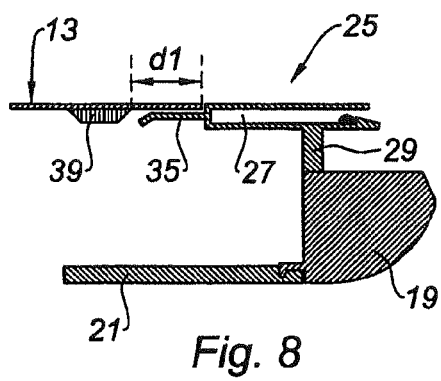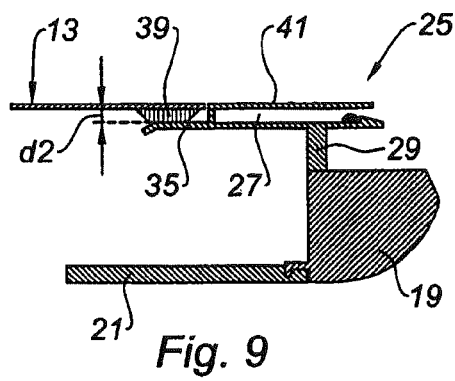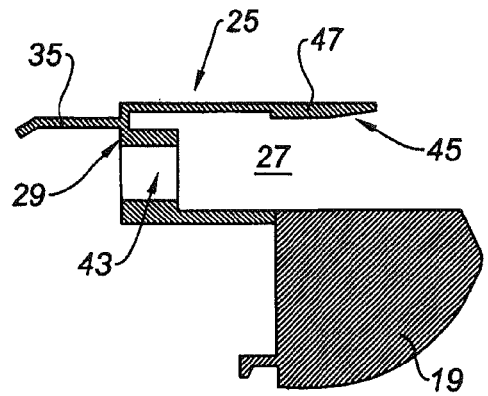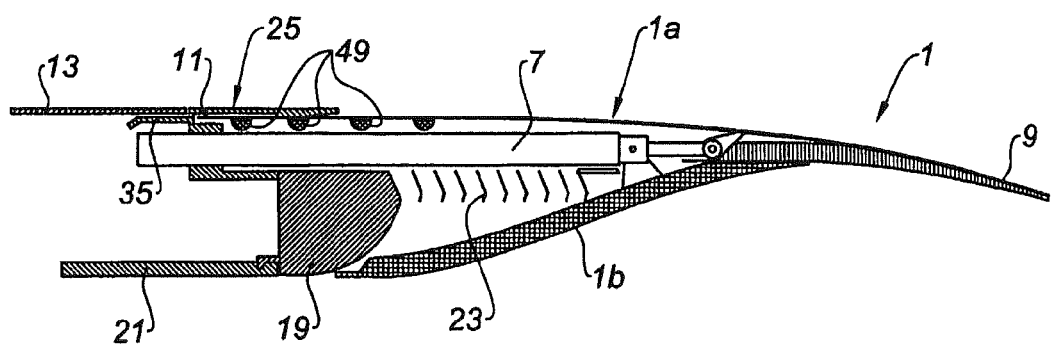

NACELLE FOR AIRCRAFT ENGINE HAVING A NOZZLE WITH A VARIABLE SECTION

TECHNICAL FIELD

The present invention relates to a nacelle for aircraft engine with a nozzle of variable cross section.

BACKGROUND

Patent application FR06/05512, filed by the applicant company on 21 Jun. 2006, discloses a nacelle for an aircraft engine comprising a cascade-type thrust reverser defining a nozzle of variable cross section.

A nacelle such as this is depicted schematically in the attached FIGS. 1 to 3.

It notably comprises a thrust reverser 1 delimiting a cold air flow path 3 with an inner structure 5 surrounding an aircraft engine (not depicted). The direction in which the air flows through this flow path is indicated by the arrow F1.

More specifically, the thrust reverser 1 comprises an outer wall 1a, able to move axially under the action of a first series of actuators 7, and an inner wall 1b able to move under the action of a second series of actuators (which are not depicted).

By operating only the first series of actuators 7 it is possible to modify the cross section of the rear part 9 of the outer wall 1a of the thrust reverser, which will then define a cold air ejection nozzle of variable cross section.

FIG. 1 depicts the outer wall 1a in the minimum cross section nozzle configuration, in which configuration the upstream zone 11 (in relation to the direction F1) of the outer wall 1a of the thrust reverser 1 slides between a cowl 13 surrounding the fan casing 21 and an annular wall 17 attached to the front frame 19 of the thrust reverser, itself attached to the fan casing 21 of the engine (it being recalled here that the front frame 19 supports cascades of vanes 23 allowing the thrust reversal function to be implemented).

FIG. 2 indicates (arrow F2) the sliding movement with which the cowl 13 may be endowed for operations of maintenance on the casing 21.

FIG. 3 indicates (arrow F3) the sliding movement with which both the outer wall 1a and the inner wall 1b may be endowed in the thrust reversal configuration, causing cold air to circulate from the flow path 3 to the outside through the thrust reversal cascades of vanes 23 (arrow F4).

One of the problems associated with the nacelle that has the aforementioned architecture relates to the interface between the outer wall 1a of the thrust reverser 1 and the cowl 13.

Specifically, for aerodynamic performance reasons, it is essential for the step 25 formed by the cowl 13 in relation to the outer wall 1a to be as shallow as possible.

It is therefore necessary that, in this zone of mutual overlap, on the one hand the thickness of the cowl 13 and on the other hand the clearance between this cowl and the outer wall 1a be minimized.

The requirement of minimal thickness for the cowl 13 prevents the provision of reinforcements (ribs or the like) for this cowl in said zone of overlap.

What this means is that this cowl 13 is liable to experience deformation in this zone, which deformation may lead to a jamming of the relative movement of the outer wall 1a in relation to the cowl 13, given the small clearances there are between these two members.

BRIEF SUMMARY

The disclosure seeks to eliminate this risk of jamming.

This is achieved with a nacelle for an airplane engine, of the type comprising a front cowl and a rear cowl, this rear cowl being mounted such that it can slide between an upstream position defining a small cross section of nozzle and a downstream position defining an enlarged cross section of nozzle, notable in that it comprises an intermediate member positioned edge to edge with said front cowl, this member defining a housing able to accommodate the upstream edge of said rear cowl when this cowl is in its upstream position.

The presence of this intermediate member makes it possible to create aerodynamic continuity between the front cowl and the rear cowl without these two components interacting with one another directly: in that way it becomes possible to get around the problems of deformation and small clearances likely to lead to these components jamming on each other.

According to other optional features of the nacelle according to the invention:

- said intermediate member comprises a region for accommodating said front cowl, this region being positioned upstream of said housing: this accommodating region allows the front cowl to be centered in relation to the intermediate member;
- said front cowl has reinforcements situated just upstream of said region: these reinforcing members allow the front cowl to be stiffened particularly near its downstream edge;
- said front cowl comprises reinforcements situated in line with said region, said region being offset radially inward by a distance that corresponds substantially to the combined radial thickness of said front cowl and of said reinforcements: this arrangement allows the reinforcing members to be located in close proximity to the downstream edge of the front cowl;
- said housing comprises a radially inner edge defining a slope for the upstream edge of said rear cowl: this slope allows the downstream cowl to be centered in relation to the housing of the intermediate member;
- said housing has a radially outer edge defining a slope for the upstream edge of said rear cowl: this particular arrangement allows the reinforcements to be positioned on the interior face of the rear cowl, near the upstream edge of this cowl;
- this nacelle comprises a seal adjacent to said slope: such a seal seals the connection between the intermediate member and the rear cowl;
- said rear cowl comprises, on its interior face, reinforcements positioned near its upstream edge: the presence of these reinforcements stiffens the upstream part of the rear cowl;
- the line where said front cowl meets said intermediate member is contained in a plane not perpendicular to the axis of said nacelle: such a meeting line, allowed by the presence of the intermediate member, notably provides better access to certain fixed members of the nacelle when the front cowl is in the maintenance position, slid forward;
- said intermediate member comprises a leg supporting actuating means, notably means of actuating said rear cowl: this arrangement allows particularly simple placement of the actuating means (actuators for example);
- said intermediate member can be attached to the fan casing of said engine;

said intermediate member comprises two halves that can be mounted in an articulated manner on a support pylon for said engine;

said intermediate member forms part of a cowl of the fan of said engine;

this nacelle comprises a cascade-type thrust reverser with cascades of vanes the exterior part of which forms said rear cowl;

said thrust reverser comprises, in addition to said exterior part, an interior part able to move independently of said exterior part: this particular embodiment corresponds to the one set out in the preamble of this description;

said intermediate member forms an integral part of the fixed structure of said thrust reverser: this intermediate member may in particular be attached to the front frame of the thrust reverser;

said front cowl incorporates the air intake lip of this nacelle;

said front cowl can be mounted such that it can slide on said engine.

Other features and advantages of the present invention will become apparent in the light of the description which will follow, and from studying the attached figures in which:

FIGS. 1 to 3, mentioned in the preamble of this description, show, in axial section, a thrust reverser of a nacelle of the prior art;

FIG. 4 depicts, in axial section, an intermediate member according to the invention mounted on the front frame of a thrust reverser;

FIGS. 5 to 7, which are similar to FIGS. 1 to 3, show a thrust reverser equipped with the intermediate member of FIG. 4, in three different configurations of the outer wall of this thrust reverser;

FIGS. 8 and 9 depict two possible alternative forms of the front cowl collaborating with the intermediate member according to the invention;

FIG. 10 depicts an alternative form of the intermediate member according to the invention designed to accommodate members for actuating the outer wall of the thrust reverser;

FIG. 11 depicts a thrust reverser comprising the intermediate member of FIG. 10;

Figure 16:
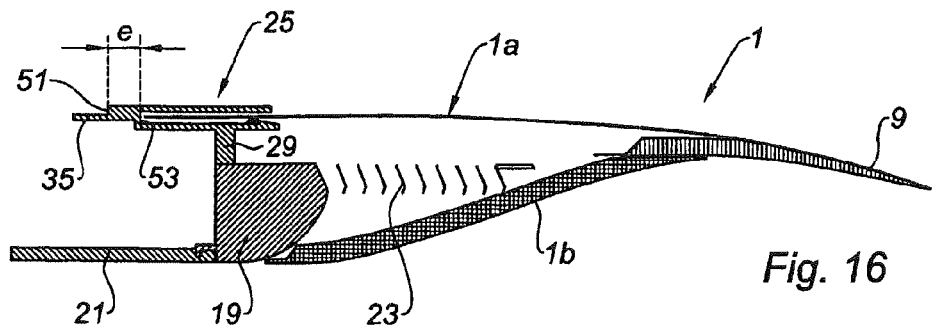
Figure 17:
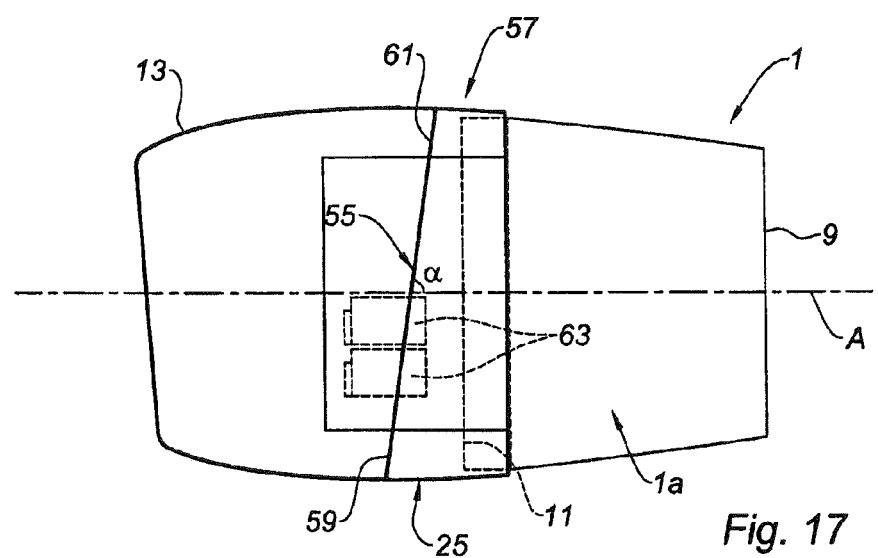
Figure 18:
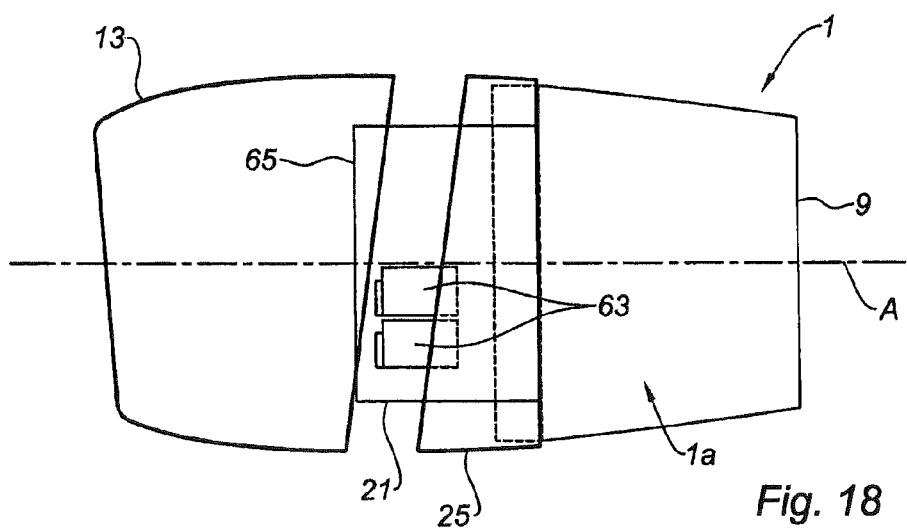

FIG. 16 depicts a thrust reverser equipped with yet another alternative form of intermediate member according to the invention; and FIGS. 17 and 18 depict, in side view, a nacelle equipped with the intermediate member of FIG. 16, the front cowl of this nacelle being mounted such that it can slide in relation to the fan casing, and incorporating the air intake lip. In these FIGS. 17 and 18, this front cowl is in the operating position and maintenance position, respectively.

DETAILED DESCRIPTION

Across all the figures, identical references denote members or sets of members that are identical or analogous.

Referring now to FIGS. 4 to 7, it may be seen that an intermediate member 25 is attached to the front frame 19 of the thrust reverser 1, this intermediate member defining a housing 27 able to accommodate the upstream edge 11 of the outer wall 1a of the thrust reverser 1.

Figure 1:
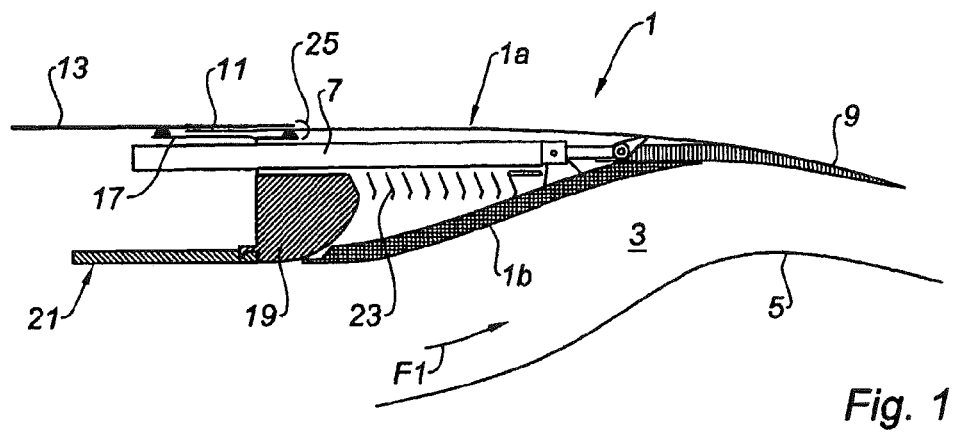
Figure 2:
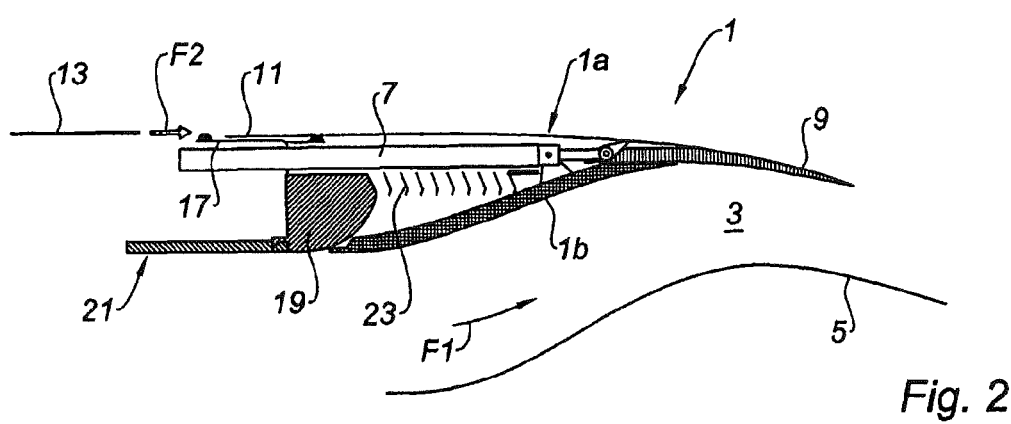
Figure 3:
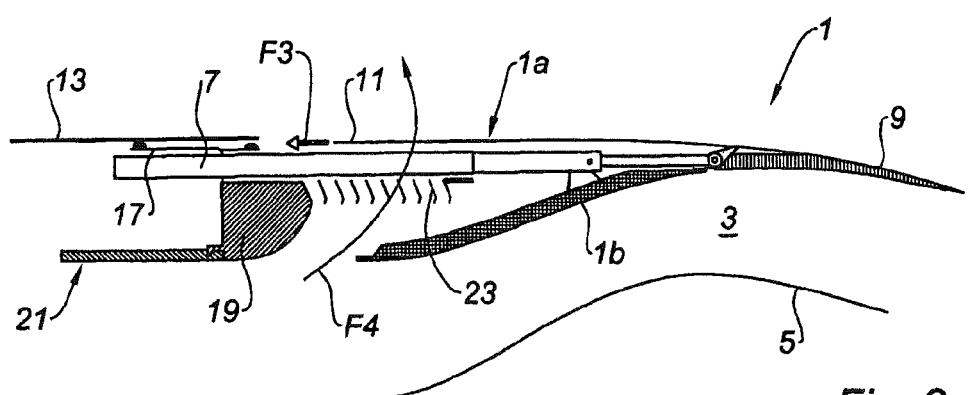
Figure 4:
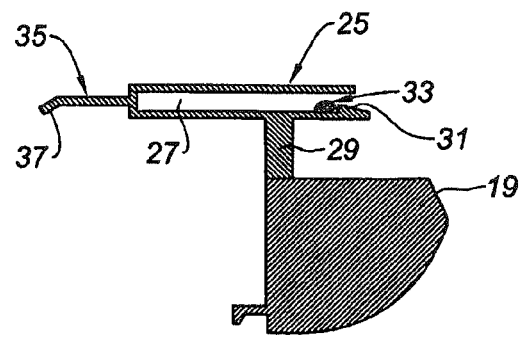

This thrust reverser may possibly be of the same type as the one in FIGS. 1 to 3, that is to say one with a variable cross section nozzle.

The intermediate member 25 extends over at least part of the circumference of the front frame 19, so that the housing 27 is of annular shape.

This intermediate member is connected to the front frame 19 by a leg 29, which itself also is of substantially annular shape.

Downstream of the housing 27 (downstream being determined in relation to the direction in which the air flows along the flow path 3, as indicated by the arrow F1 in FIGS. 1 and 2) there is preferably a slope 31 making it easier to center and to fit the upstream edge 11 of the outer wall 1a inside the housing 27.

There is preferably also a seal 33, positioned just upstream of the slope 31, to allow a sealed connection between the outer wall 1a and the intermediate member 25.

Upstream of the housing 27 there is a centering member 35 that allows a front cowl of the nacelle 13 to be correctly centered and positioned.

This centering member 35 may itself have a slope 37 to make this centering easier.

The front cowl 13 frees access to the fan casing 21 during maintenance operations, by sliding in relation to this casing.

Figure 5:
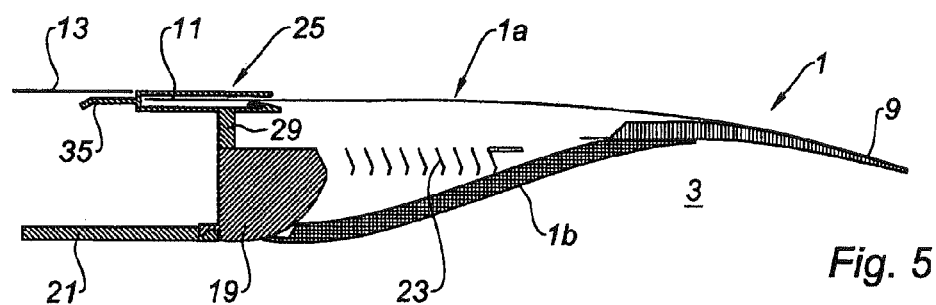
Figure 6:
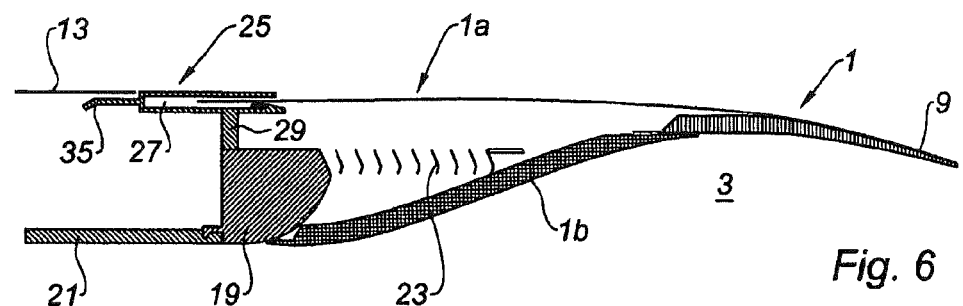
Figure 7:
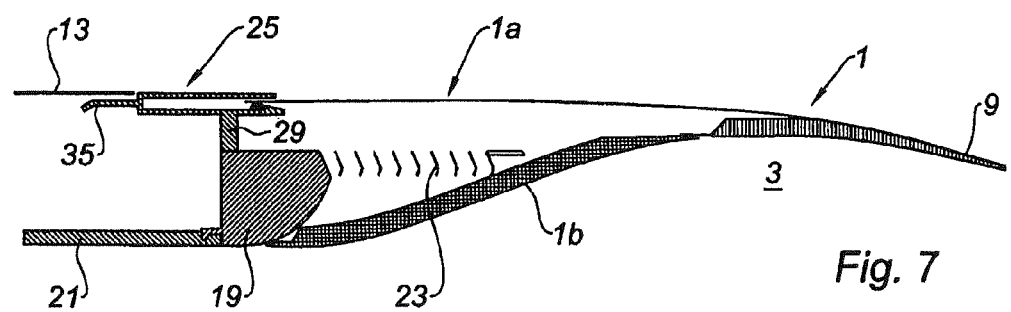

FIGS. 5 to 7 show three different positions of the outer wall 1a of the thrust reverser 1, these corresponding to various nozzle cross sections desired for various phases of flight of an aircraft.

In the particular example depicted, the inner wall 1b of the thrust reverser is kept in an upstream position, that is to say covers the cascades of vanes 23 of the reverser, so that the thrust reverser function is not active.

However, it must of course be appreciated that when the thrust reverser function is desired, the outer cowl 1a and the inner cowl 1b slide downstream of their positions depicted in FIG. 7, thus uncovering the cascades of vanes 23 and allowing the flow of air flowing through the member 3 to be reversed.

FIG. 8 reveals the fact that circumferential reinforcements 39 can be provided under the inner face of the cowl 13, these reinforcements being separated axially from the downstream edge of the cowl 13 or by a distance d1 corresponding substantially to the axial length of the centering member 35.

If it is desired to improve the rigidity of the downstream end of the cowl 13, then the reinforcements 39 can be positioned as indicated in FIG. 9, that is to say directly adjacent to the downstream edge of this cowl, in which case it is necessary to ensure that the centering member 35 is offset radially in relation to the outer face 41 of the intermediate member 25 by a distance of d2 substantially equal to the combined radial thickness of the cowl 13 and of the reinforcements 39.

In the alternative form depicted in FIG. 10, it may be seen that holes 43 may be provided in the leg 29 of the intermediate member 25, these holes being able to accommodate actuators 7 for actuating the outer wall 1a of the thrust reverser 1 (see FIG. 11 in particular).

It can also be seen from FIGS. 9 and 11 that provision may be made for a slope 45 to be positioned on the edge 47 situated radially on the outside of the housing 27.

As can be seen in FIG. 11, such an arrangement of the slope 45 means that reinforcements 49 can be provided that are located under the upstream edge 11 of the outer wall 1a of the thrust reverser 1.

FIGS. 12 to 15 show the dynamics of opening of a nacelle equipped with an alternative form of intermediate member 25 according to the invention, in which alternative form this intermediate member may be formed of two halves each mounted such that it can pivot on a nacelle support pylon (not depicted), about axes substantially parallel to the axis of this nacelle.

In this case, the leg 29 of the intermediate member 25 is not definitively mounted on the front frame 19 of the thrust reverser: each leg 19 of the associated half intermediate member 25 may be separated from the front frame 19 at the time of maintenance operations.

Figure 12:
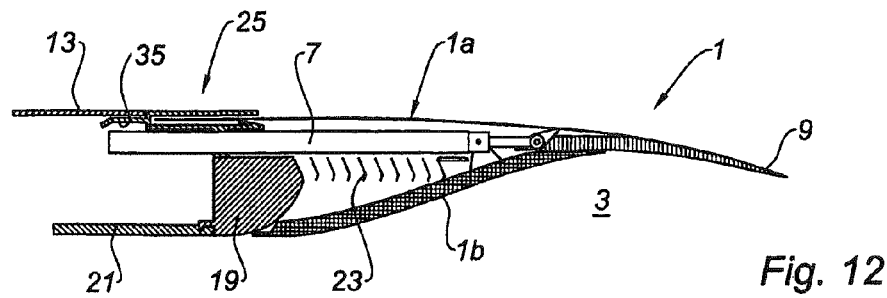
FIGS. 12 to 15 depict the dynamics of the opening, during maintenance operations, of an intermediate member according to another alternative form of the invention.
Figure 13:
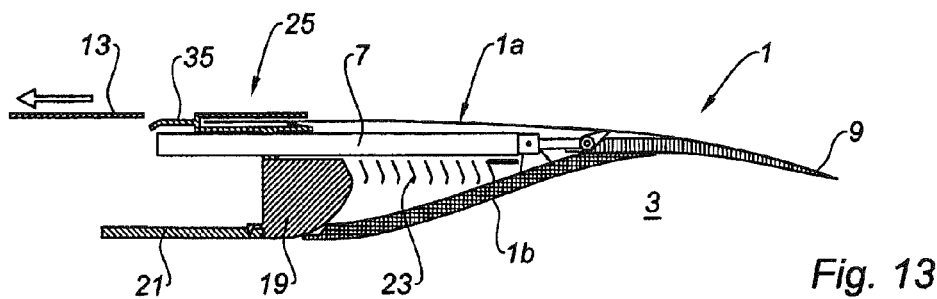

Starting out from a normal operating configuration depicted in FIG. 12, in which the cowl 13 sits edge to edge with the intermediate member 25, and the upstream edge 11 of the outer wall 1a penetrates the housing 27 of the intermediate member 25, the first thing to do is to slide the front cowl 13 toward the upstream end of the nacelle, as can be seen in FIG. 13.

Figure 14:
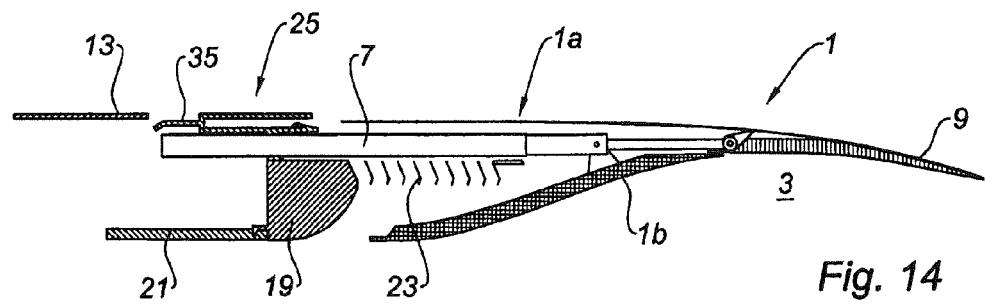
Figure 15:
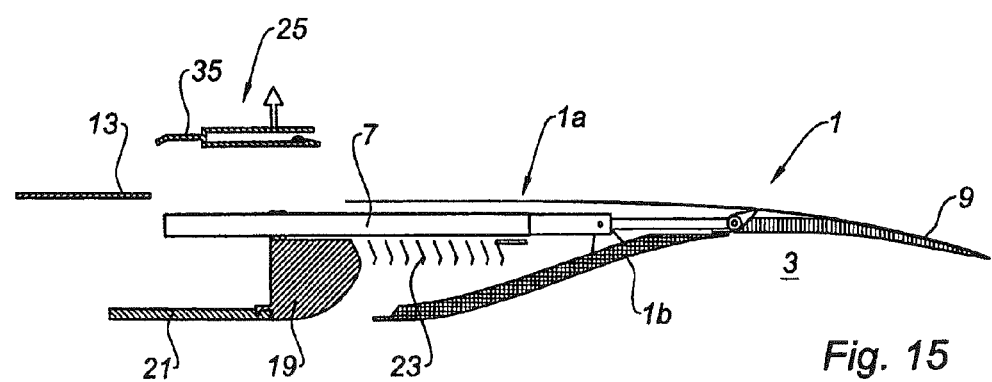

The outer 1a and inner 1b walls of the thrust reverser are then slid in the downstream direction of the nacelle, notably by means of the actuators 7, as has been depicted in FIG. 14.

That then leads to a situation in which the intermediate member 25 no longer collaborates either with the front cowl 13 or with the outer wall 1a of the thrust reverser.

Starting from this situation, each half intermediate member 25 is pivoted about the pylon (not depicted) that supports the nacelle (opening of the "gull-wing" door type).

In FIGS. 16 to 18 it can be seen that, by suitably varying the thickness e separating the upstream edge 51 from the front 53 of the housing 27 of the intermediate member 25 it is possible to obtain a line 55 where the front cowl 13 meets the outer wall 1a of the thrust reverser that is inclined at some arbitrary angle α with respect to the axis A of a nacelle 57.

In particular, and as can be seen in FIGS. 17 and 18, provision may be made for the lower part 59 of the meeting line 55 to be positioned further toward the upstream end of the nacelle than the upper part 61 of this meeting line.

Thanks to this special arrangement, and when the front cowl of the nacelle 13 is mounted such that it can slide in relation to the fan casing 21 for maintenance operations (see FIG. 18), easier access can be had to members 63 (pumps, electronic housing, etc.,) attached to the lower half of the fan casing 21 and near the upstream edge 65 of this fan casing.

It will have been appreciated from the foregoing description that the intermediate member 25 constitutes a fixed component that collaborates independently with, on the one hand, the front cowl 13 and, on the other hand, the outer wall 1a of the thrust reverser.

Thanks to this intermediate member 25, the issues involved become simple matters of the dynamics of the moving component/fixed component, and the risks of jamming inherent to the systems of the prior art are obviated.

Indeed, all that is required is, on the one hand, for the front cowl 13 and, on the other hand, for the outer wall 1a, to be dimensioned with tolerances suited to obtaining perfectly dependable dynamics in relation to the intermediate member 25.

Of course, the present invention is not in any way restricted to the embodiments described and depicted, which have been provided simply by way of examples.

In particular, it will be appreciated that the present invention can also be applied to nacelles of the so-called "plain" types, that is to say to nacelles that have no thrust reverser means.

In such instances, the outer wall described above in fact forms the simple rear cowl of a rear part of the nacelle of variable nozzle cross section, rather than the outer wall of a thrust reverser.

Thus also, it may be possible to have the intermediate member 25 form an integral part of a cowl covering the casing 21, it being possible for this cowl to be opened slidably like the cowl 13 described above, or alternatively in the "gull-wing" manner, for example about the pylon that supports the nacelle.

The invention claimed is:

1. A nacelle for an airplane engine, comprising:
   a thrust reverser;
   a front cowl and a rear cowl, the rear cowl being mounted such that it can the rear cowl can slide between an upstream position defining a small cross section of nozzle and a downstream position defining an enlarged cross section of nozzle; and
   an intermediate member attached to a front frame of the thrust reverser and positioned edge to edge with said front cowl, this intermediate member; defining a housing having a hollow interior facing downstream into which an upstream edge of said rear cowl penetrates when the rear cowl is in its upstream position and a centering member extending upstream and on opposite side of the housing for proper positioning of the front cowl.

2. The nacelle as claimed in claim 1, wherein said front cowl has reinforcements situated just upstream of said centering member.

3. The nacelle as claimed in claim 1, wherein said front cowl comprises reinforcements situated in line with said centering member, said centering member being offset radially inward by a distance that corresponds substantially to a combined radial thickness of said front cowl and of said reinforcements.

4. The nacelle as claimed in claim 1, wherein said housing comprises a radially inner edge defining a slope for the upstream edge of said rear cowl.

5. The nacelle as claimed in claim 1, wherein said housing has a radially outer edge defining a slope for the upstream edge of said rear cowl.

6. The nacelle as claimed in one of claim 4, further comprising a seal adjacent to said slope.

7. The nacelle as claimed in claim 4, wherein said rear cowl comprises, on an interior face, reinforcements positioned near the upstream edge.

8. The nacelle as claimed in claim 1, wherein a line where said front cowl meets said intermediate member is contained in a plane not perpendicular to an axis of said nacelle.

9. The nacelle as claimed in claim 1, wherein said intermediate member can be attached to a fan casing of said engine.

10. The nacelle as claimed in claim 1, wherein said intermediate member comprises two halves that can be mounted in an articulated manner on a support pylon for said engine.

11. The nacelle as claimed in claim 1, wherein said intermediate member forms part of a cowl of a fan of said engine.

12. The nacelle as claimed in claim 1, further comprising a cascade-type thrust reverser with cascades of vanes an exterior part of which forms said rear cowl.

13. The nacelle as claimed in claim 12, wherein said thrust reverser comprises, in addition to said exterior part, an interior part able to move independently of said exterior part.

14. The nacelle as claimed in claim 12, wherein said intermediate member forms an integral part of a fixed structure of said thrust reverser.

15. The nacelle as claimed in claim 1, wherein said front cowl incorporates an air intake lip of this nacelle.

16. The nacelle as claimed in claim 1, wherein said front cowl can be mounted such that said front cowl can slide on said engine.

* * * * *